(12) United States Patent
Tatsumi

(10) Patent No.: US 9,327,687 B2
(45) Date of Patent: May 3, 2016

(54) WIPER BLADE

(71) Applicant: Trend East Yugen Kalsha, Tokyo (JP)

(72) Inventor: Keiji Tatsumi, Tokyo (JP)

(73) Assignee: Trend East Yugen Kaisha, Nerima-ku, Tokyo (JP)

( * ) Notice: Subject to any disclaimer, the term of this patent is extended or adjusted under 35 U.S.C. 154(b) by 0 days.

(21) Appl. No.: 14/356,939

(22) PCT Filed: Jun. 25, 2013

(86) PCT No.: PCT/JP2013/067357
§ 371 (c)(1),
(2) Date: May 8, 2014

(87) PCT Pub. No.: WO2014/007106
PCT Pub. Date: Jan. 9, 2014

(65) Prior Publication Data
US 2015/0101142 A1    Apr. 16, 2015

(30) Foreign Application Priority Data

Jul. 5, 2012 (JP) .................................. 2012-151459

(51) Int. Cl.
*B60S 1/38* (2006.01)
*A47L 13/11* (2006.01)
*B60S 1/04* (2006.01)

(52) U.S. Cl.
CPC ................. *B60S 1/38* (2013.01); *B60S 1/3801* (2013.01); *A47L 13/11* (2013.01); *B60S 1/0452* (2013.01); *B60S 2001/3836* (2013.01); *B60S 2001/3837* (2013.01)

(58) Field of Classification Search
CPC ............... B60S 1/38; B60S 2001/3836; B60S 2001/3837; B60S 2001/3839; A47L 13/11
USPC .......... 15/250.48, 250.361, 250.001, 250.41, 15/250.4, 245
See application file for complete search history.

(56) References Cited

U.S. PATENT DOCUMENTS

| 229,430 A | * | 6/1880 | Linscott | .......................... 15/245 |
| 1,720,630 A | * | 7/1929 | Eiermann | ........................ 15/245 |

(Continued)

FOREIGN PATENT DOCUMENTS

| FR | 2420460 |   | * 10/1979 |
| JP | S58129258 U |   | 9/1983 |

(Continued)

OTHER PUBLICATIONS

International Search Report for PCT/JP2013/067357, Dated Jul. 30, 2013.

*Primary Examiner* — Gary Graham
(74) *Attorney, Agent, or Firm* — Boyle Fredrickson, S.C.

(57) ABSTRACT

A conventional wiper blade has such drawbacks that during the wiper portion is moved on the surface of the windshield in order to remove rainwater etc. attached on the surface of the windshield, the rainwater etc. trapped by the wiper portion flows from a free end portion of the wiper portion to the surface of the windshield by the centrifugal force applied to the trapped rainwater etc., so that the visibility of the windshield is lowered.

[Manner for solve the Task]

The wiper device of the present invention comprises a wiper portion having a lip portion sliding on a surface of the vehicle windshield for wiping the surface of the windshield, and a rainwater reserving portion formed on one side surface of a tip end portion of the lip portion, the rainwater reserving portion being extending normally to and outwardly from one side surface of the tip end portion of the lip portion and having a concave rearward surface. The concave surface and an end surface of the rain water receiving portion form a sharp tip end.

3 Claims, 5 Drawing Sheets

(56) References Cited

U.S. PATENT DOCUMENTS 1,978,192 A * 10/1934 Freud .......................... 15/250.41
2,814,822 A * 12/1957 Page .............................. 15/245
3,081,477 A *  3/1963 Ridenour ..................... 15/250.3
3,119,138 A *  1/1964 Davis ........................... 15/245.1
3,238,555 A *  3/1966 Cels ............................ 15/250.04

FOREIGN PATENT DOCUMENTS

| JP | 62-265052 | * 11/1987 |
| JP | H078122 U | 2/1995 |
| JP | H09221005 A | 8/1997 |

* cited by examiner (PRIOR ART)

(PRIOR ART)

(PRIOR ART)

WIPER BLADE

BACKGROUND OF THE INVENTION

1. Field of the Invention

The present invention relates to a wiper blade, and more particularly, relates to a windshield wiper blade for use on a vehicle windshield.

2. Description of the Related Art

A windshield wiper blade is provided on the vehicle in order to remove rainwater etc. attached on the windshield. FIG. 6 shows a conventional wiper blade device 1 comprising a wiper arm 2 supported by a privet (not shown) formed on a vehicle so as to be moved in the clockwise direction and counter-clockwise direction, a wiper blade body 3 supported by a free end portion of the wiper arm 2, and a wiper portion 4 fixed to the wiper blade body 3 by a fixing device 5, the wiper portion 4 being sliding on a surface of a windshield 8 of the vehicle.

FIG. 7 shows the wiper portion 4 comprising an elongated base portion 6 fixed to the wiper blade body 3 by the fixing device 5, and an elongated lip portion 7 connected to the base portion 6 so as to slide on the surface of the windshield 8 for removing rainwater etc. attached on the surface of the windshield.

The wiper portion 4 is publicly known.

The conventional wiper portion 4 has such drawbacks that during the wiper portion 4 is moved in a direction B on the surface of the windshield 8 in order to remove rainwater etc. attached on the surface of the windshield, the rainwater etc. trapped by the wiper portion 4 flows in a direction A from a free end portion 4a of the wiper portion 4 to the surface of the windshield by the centrifugal force applied to the trapped rainwater etc. as shown in FIG. 8 or FIG. 9, so that the visibility of the windshield is lowered.

SUMMARY OF THE INVENTION

An object of the present invention is to provide a wiper blade which eliminates the above drawbacks of the conventional wiper blade.

A windwiper of the present invention comprises a wiper portion having a lip portion sliding on a surface of the vehicle windshield for wiping the surface of the windshield, and a rainwater reserving portion formed on one side surface of a tip end portion of the lip portion, the rainwater reserving portion being extending normally to and outwardly from one side surface of the tip end portion of the lip portion. The rainwater reserving portion has a concave rearward surface.

A further object of the present invention is to provide a windshield wiper blade comprising rainwater reserving portions formed on both side surfaces of a tip end portion of the lip portion, respectively outwardly from each side surface of the tip end portion of the lip portion and having a concave rearward surface.

According to the wiper portion of the present invention, rainwater trapped wiper portion 9 is reserved in the rainwater reserving portion and the reserved rainwater is not escaped from the rainwater reserving portion on the surface of the windshield, so that the visibility of the windshield is not lowered.

Further, the thickness of the tip end portion of the lip portion becomes large because of the rainwater reserving portion formed on the tip end portion of the lip portion, so that the tip end portion of the lip portion is prevented from being turned so that the reserved rainwater in the rainwater reserving portion is not escaped to the outside, when the wiper portion is moved.

DETAILED DESCRIPTION OF THE PREFERRED EMBODIMENTS

Figure 1:
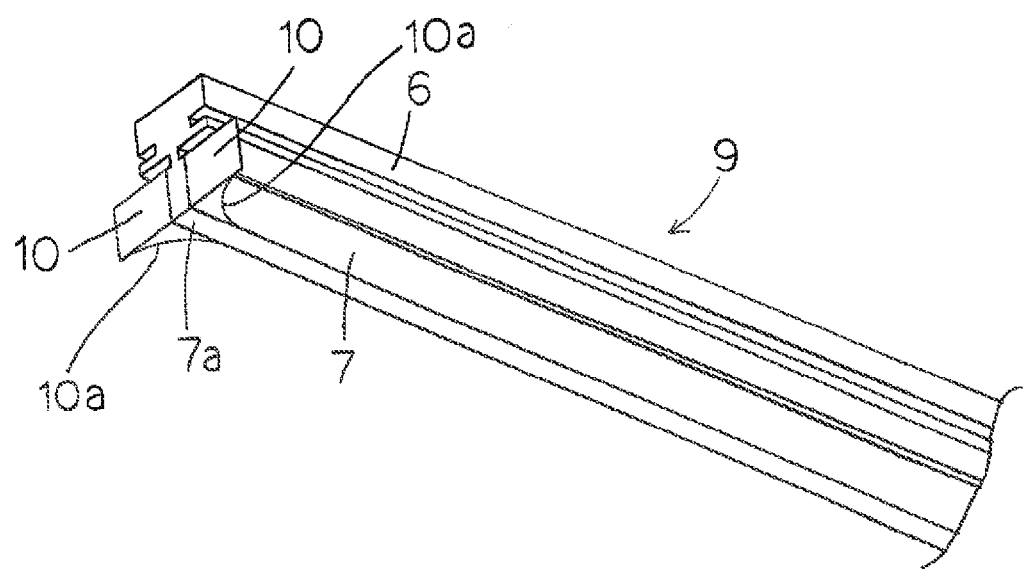
FIG. 1 is a perspective view of an essential portion of a wiper portion of a wiper blade according to the present invention.

Embodiments of a wiper blade according to the present invention will be explained with reference to the drawings. Parts of the wiper blade shown in FIG. 1 to FIG. 5 which are similar to corresponding parts of the conventional wiper blade shown in FIG. 6 to FIG. 9 have been given corresponding reference numerals and need not be further redescribed.

Figure 2:
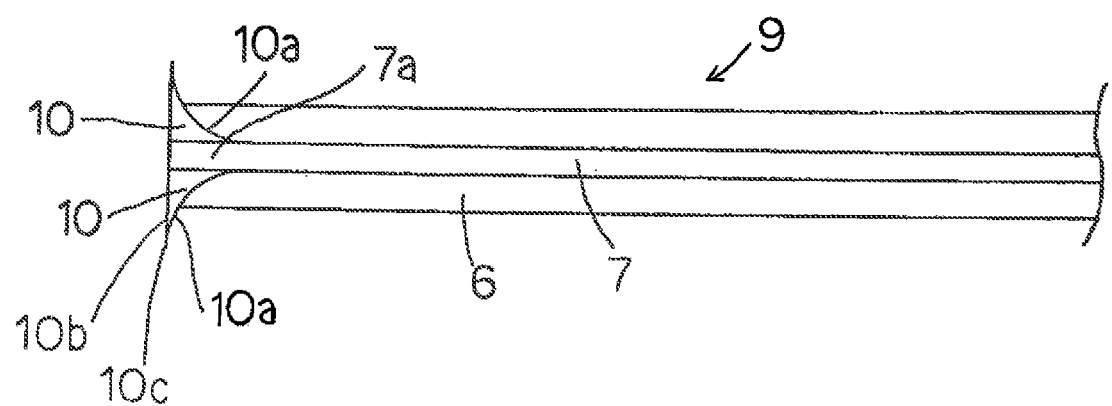
FIG. 2 is a bottom view of the essential portion of the wiper portion of the wiper blade according to the present invention.
Figure 3:
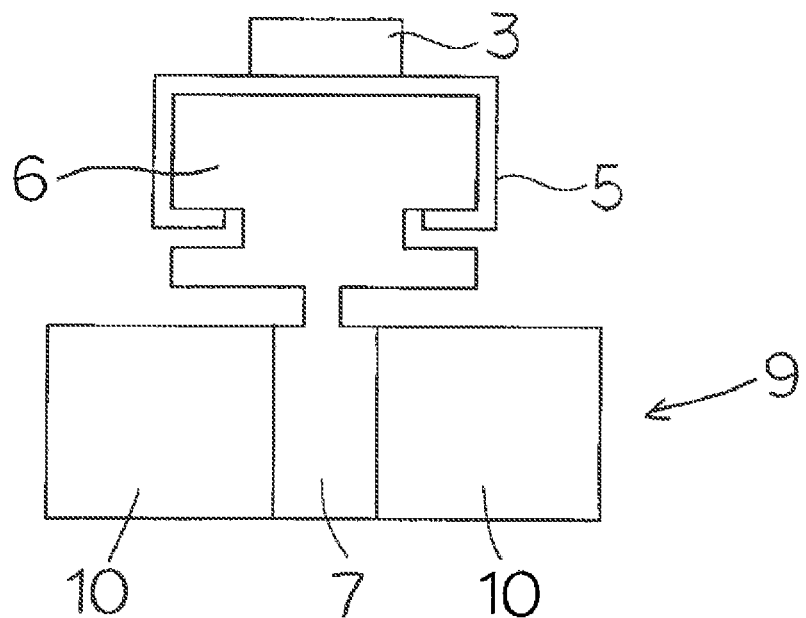
FIG. 3 is an enlarged side view of the wiper portion of the wiper blade according to the present invention.

A wiper blade in the embodiment of the present invention comprises as shown in FIG. 1 to FIG. 3 a wiper portion 9 having a base portion 6 and a lip portion 7 connected to the base portion 6, and rainwater reserving portions 10, each formed on each of side surfaces at a tip end portion 7a of the lip portion 7, each of the rainwater reserving portions 10 being protruding normally to and outwardly from each side surface of the tip end portion 7a of the lip portion 7.

The rainwater reserving portion 10 has a rearward concave surface 10a. The concave surface 10a and an end surface 10b of the rain water receiving portion 10 form a sharp tip end 10c.

The wiper portion 9 and the rainwater reserving portion 10 are made of rubber or silicone, for example.

According to the wiper portion of the present invention, rainwater trapped by the wiper portion is reserved in the rainwater reserving portion 10 and the reserved rainwater is not escaped from the rainwater reserving portion 10 on the surface of the windshield, so that the visibility of the windshield is not lowered.

Further, the thickness of the tip end portion 7a of the lip portion 7 becomes large because of the rainwater reserving portion 10 formed on the tip end portion 7a of the lip portion 7, so that the tip end portion of the lip portion is prevented from being turned over so that the reserved rainwater in the rainwater reserving portion is not escaped to the outside, when the wiper portion is moved.

Only the thin tip end 10c is deformed when the wiper portion is moved, so that the friction formed between the tip end 10c and the windshield 8 is reduced and that the deformation and turn over of the other portion of the rain water receiving portion 10 can be prevented.

Further, the thickness and the stiffness of the rain water receiving portion 10 is reduced gradually from the bottom portion to the tip end 10c thereof, so that entire portion of the rearward concave surface 10a is prevented from being turned over.

Figure 4:
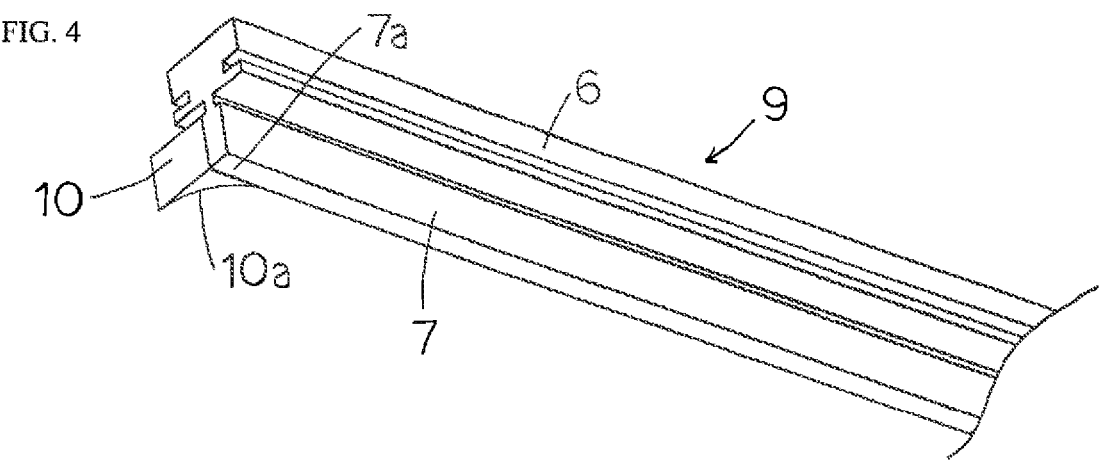
FIG. 4 is a perspective view of a wiper portion of a wiper blade according to the other embodiment of the present invention.
Figure 5:
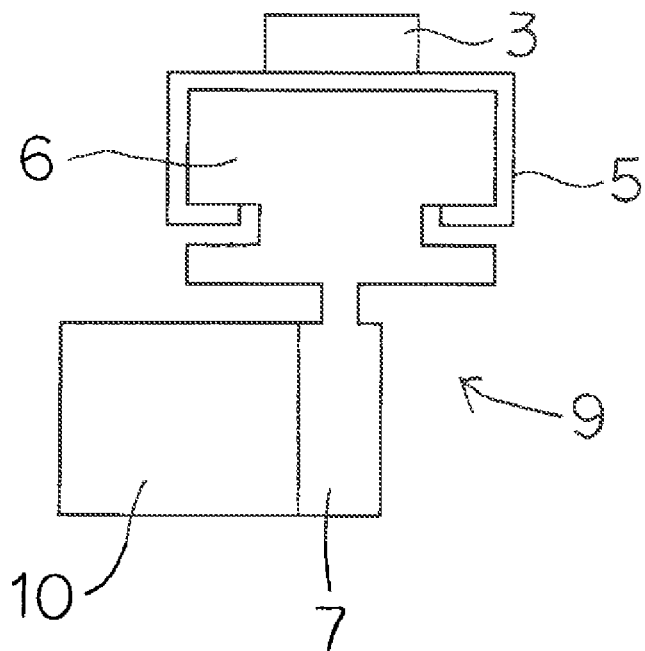
FIG. 5 is an enlarged side view of the wiper portion of the wiper blade according to the other embodiment of the present invention.
Figure 6:
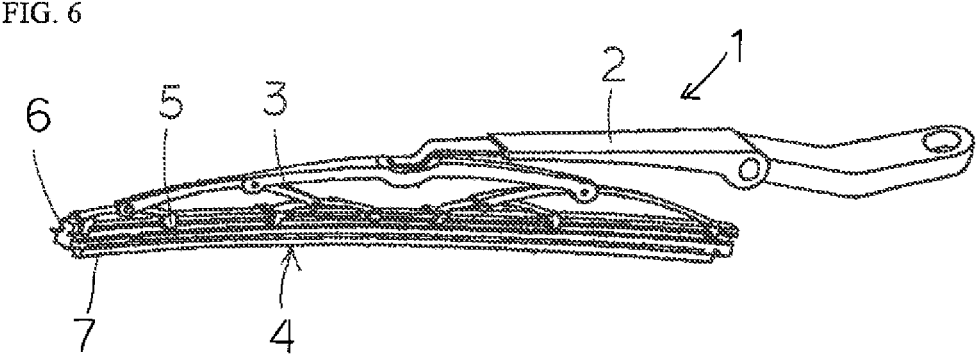
FIG. 6 is a perspective view of a conventional wiper blade device, labeled "PRIOR ART".
Figure 7:
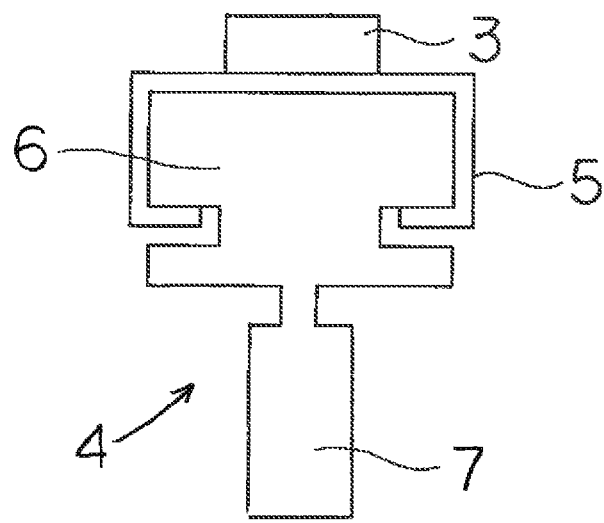
FIG. 7 is an enlarged side view of a conventional wiper blade, labeled "PRIOR ART".
Figure 8:
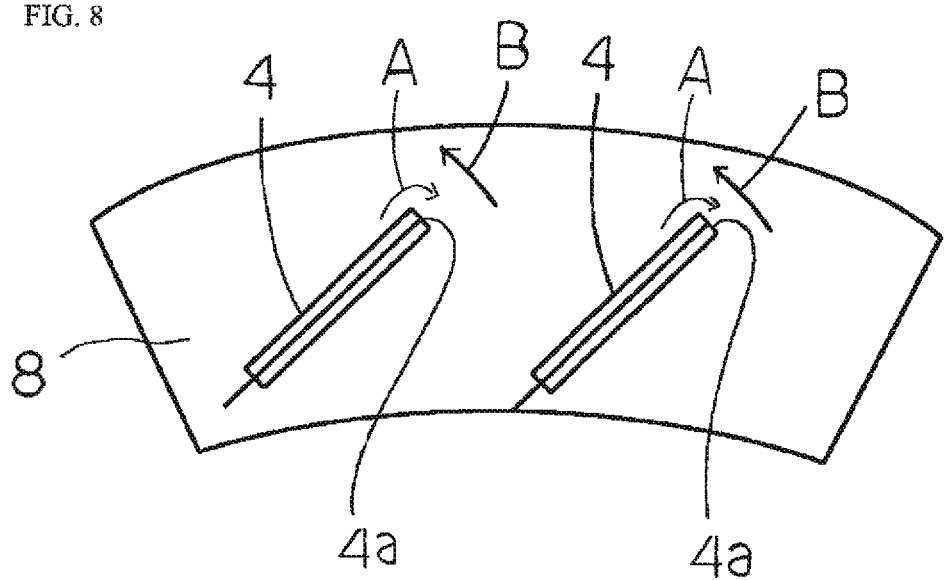
FIG. 8 is a view for explaining the state in use of the conventional wiper blade, labeled "PRIOR ART".
Figure 9:
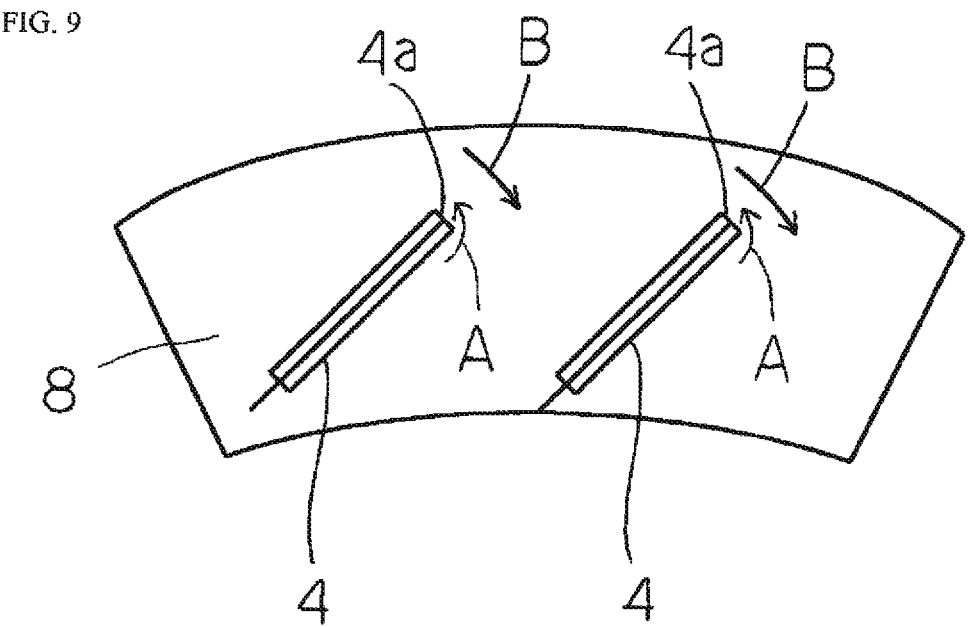
FIG. 9 is a view for explaining the state in use of the conventional wiper blade, labeled "PRIOR ART".

In the other embodiment of the present invention, the rainwater reserving portion 10 is formed only one side surface of the tip end portion 7a of the lip position 7, as shown in FIG. 4 and FIG. 5.

REFERENCE CHARACTERS 1. wiper blade device
2. wiper arm
3. wiper blade
4. wiper portion
4a. tip portion of free end side
5. fixing device
6. base portion
7. lip portion
7a. tip portion of free end side
8. windshield
9. wiper portion
10. rainwater reserving portion
10a. inside side surface
10b. end surface
10c. tip end

The invention claimed is:

1. A wiper blade comprising:
    a wiper portion having a base portion and a lip portion extending outwardly from the base portion, wherein the lip portion is configured to slide across a surface of a vehicle windshield, wherein the lip portion is elongated and has a tip end portion having first and second opposed side surfaces; and
    a rainwater reserving portion formed one of the side surfaces of the tip end portion, wherein the rainwater reserving portion has an outer surface portion that extends normally to and outwardly from the outermost end of one of the side surfaces of the tip end portion, and wherein the rainwater reserving portion has a concave inner surface portion.

2. The wiper blade as claimed in claim 1, wherein rainwater reserving portions are formed on both side surfaces of the tip end portion of the lip portion.

3. The wiper blade as claimed in claim 1, wherein the thickness of the rainwater reserving portion is reduced gradually from a bottom portion to a tip end thereof.

* * * * *